(12) United States Patent
Rangaraju

(10) Patent No.: US 12,182,012 B2
(45) Date of Patent: Dec. 31, 2024

(54) SMART EXTENDED REALITY DATA OF USAGE (XR-DOU) FRAMEWORK FOR COMPETITIVE POWER SOLUTION SCHEME

(71) Applicant: QUALCOMM Incorporated, San Diego, CA (US)

(72) Inventor: Karthik Rangaraju, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 18/104,223

(22) Filed: Jan. 31, 2023

(65) Prior Publication Data
US 2024/0256438 A1 Aug. 1, 2024

(51) Int. Cl.
G06F 12/02 (2006.01)
G05B 23/02 (2006.01)
G06F 11/34 (2006.01)
G06F 12/0891 (2016.01)
G06F 16/17 (2019.01)

(52) U.S. Cl.
CPC ....... *G06F 12/0238* (2013.01); *G05B 23/024* (2013.01); *G06F 11/3452* (2013.01); *G06F 12/0891* (2013.01); *G06F 16/1737* (2019.01); *G06F 2212/1028* (2013.01)

(58) Field of Classification Search
CPC ............. G06F 12/0238; G06F 11/3452; G06F 12/0891; G06F 16/1737; G06F 2212/1028
See application file for complete search history.

(56) References Cited

U.S. PATENT DOCUMENTS

| 6,731,655 | B1* | 5/2004 | Shuto ............... H02H 7/263 370/503 |
| 8,659,656 | B1* | 2/2014 | Cruz-Albrecht ..... G06V 10/955 341/138 |
| 2019/0155370 | A1* | 5/2019 | Ramani ............ G06F 1/3287 |
| 2019/0266689 | A1* | 8/2019 | Williams ........... G06Q 30/018 |
| 2020/0409448 | A1* | 12/2020 | He .................. H01L 23/3114 |
| 2021/0365392 | A1* | 11/2021 | He .................. G06F 12/1009 |
| 2021/0405892 | A1* | 12/2021 | Bonen ............... G11C 11/40615 |
| 2022/0075438 | A1* | 3/2022 | Palmer ............. G06F 1/3228 |
| 2022/0166454 | A1* | 5/2022 | Jaurigue ............. H04B 17/30 |
| 2022/0206821 | A1* | 6/2022 | Devegowda ......... G06F 9/4401 |

OTHER PUBLICATIONS

International Search Report and Written Opinion—PCT/US2023/081186—ISA/EPO—Mar. 12, 2024.

* cited by examiner

*Primary Examiner* — Charles Rones
*Assistant Examiner* — Alexander Vinnitsky
(74) *Attorney, Agent, or Firm* — QUALCOMM Incorporated

(57) ABSTRACT

A method for memory management is described. The method includes detecting entry of a mobile device into a deep sleep state. The method also includes monitoring a hysteresis counter of entry into the deep sleep state relative to a time period of the mobile device in the deep sleep state to compute a hysteresis statistical threshold. The method further includes comparing the hysteresis statistical threshold to a threshold configuration value. The method also includes adjusting memory management of the mobile device and/or frequency scaling when the hysteresis statistical threshold is greater than the threshold configuration value.

20 Claims, 11 Drawing Sheets

SMART EXTENDED REALITY DATA OF USAGE (XR-DOU) FRAMEWORK FOR COMPETITIVE POWER SOLUTION SCHEME

FIELD OF THE DISCLOSURE

The present disclosure relates generally to processing systems and, more particularly, to one or more techniques for a smart extended reality data of usage (XR-DOU) framework for a competitive power and performance solution scheme.

BACKGROUND

The mobile gaming market is becoming one of the most important markets in the mobile world. In this market, users care greatly about game performance. Video game applications running on a mobile device may sacrifice game performance to improve battery life by controlling power consumption when a user plays a game on the mobile device. A successful game application running on the mobile device may provide exceptional game performance, while reducing power consumption to improve battery life of the mobile device.

Mobile extended reality (XR) gaming devices are part of a relatively new mobile gaming market that is gaining significant traction. These XR mobile gaming device are implemented with integrated connectivity solutions to support various communications applications. During operation, these integrated connectivity solutions engage in periodic activities, such as paging (e.g., new radio (NR)/5G/Sub-6), connected mode discontinuous reception (CDRx), a delivery traffic indication message (DTIM), scan, and sniff. Supporting these integrated connectivity solutions involves the allocation of increased cache memory resources to enable successfully operation of mobile XR gaming devices.

Additionally, mobile XR gaming devices are configured to enter a deep sleep state for conversing battery power. Unfortunately, the activities of the connectivity solutions may cause frequent exits from the deep sleep state. In particular, specified system cache flushing and rebuilding policies in response to exiting the deep sleep state are especially problem due to increased system cache memory provided to enable high performance operation of mobile XR gaming devices. As a result, a reduced power consumption technique for providing an improved user experience without sacrificing game performance when operating an XR mobile gaming device due to the system cache flushing and rebuilding policies in response to exiting a deep sleep state is desired.

SUMMARY

A method for memory management is described. The method includes detecting entry of a mobile device into a deep sleep state. The method also includes monitoring a hysteresis counter of entry into the deep sleep state relative to a time period of the mobile device in the deep sleep state to compute a hysteresis statistical threshold. The method further includes comparing the hysteresis statistical threshold to a threshold configuration value. The method also includes adjusting memory management of the mobile device and/or frequency scaling when the hysteresis statistical threshold is greater than the threshold configuration value.

A non-transitory computer-readable medium having program code recorded thereon for memory management is described. The program code is executed by a processor. The non-transitory computer-readable medium includes program code to detect entry of a mobile device into a deep sleep state. The non-transitory computer-readable medium also includes program code to monitor a hysteresis counter of entry into the deep sleep state relative to a time period of the mobile device in the deep sleep state to compute a hysteresis statistical threshold. The non-transitory computer-readable medium further includes program code to compare the hysteresis statistical threshold to a threshold configuration value. The non-transitory computer-readable medium also includes program code to adjust memory management of the mobile device and/or frequency scaling when the hysteresis statistical threshold is greater than the threshold configuration value.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF DRAWINGS

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
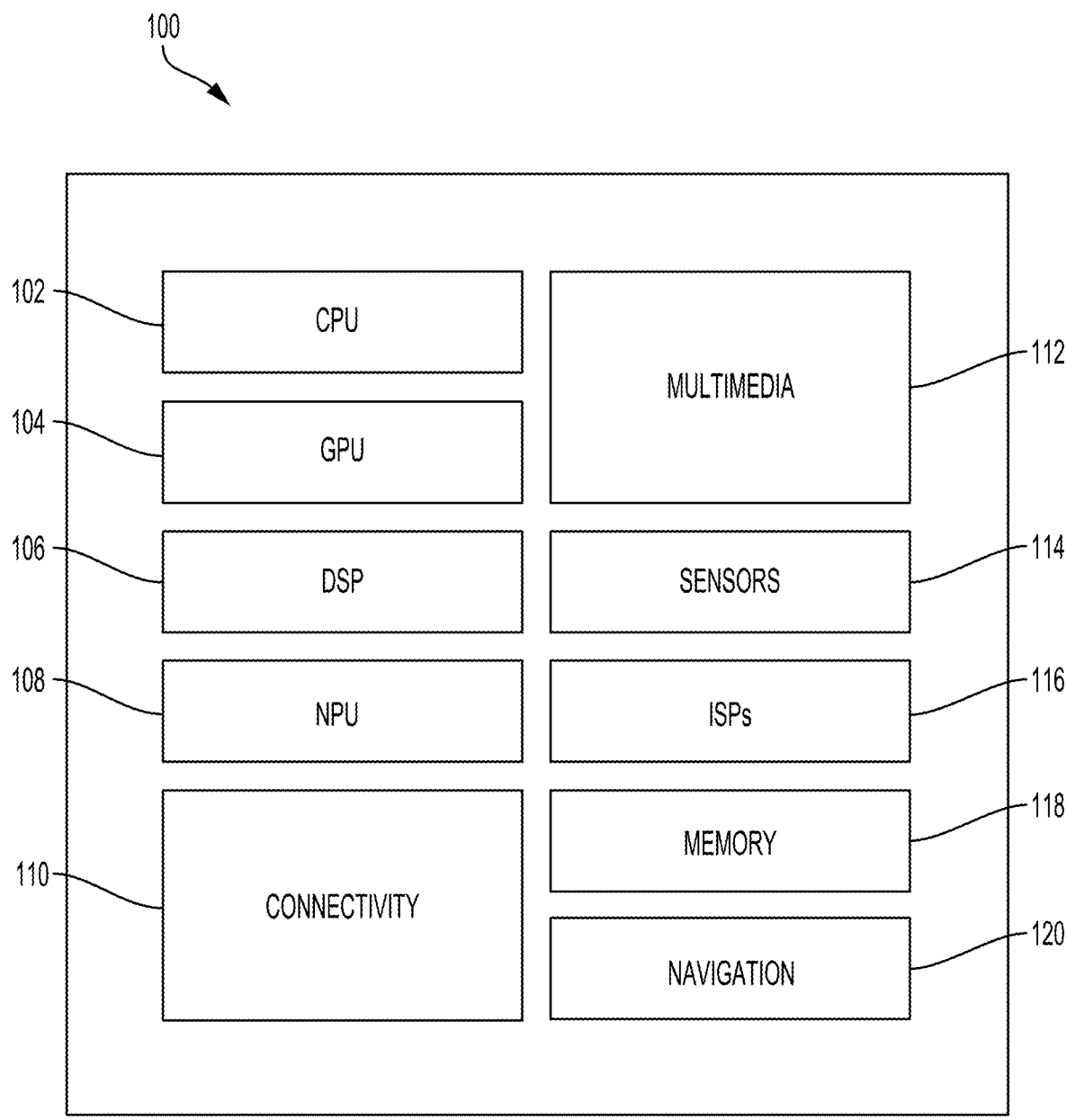
FIG. 1 illustrates an example implementation of a system-on-a-chip (SoC), including a graphics processing unit (GPU) to support extended reality (XR) gaming applications, in accordance with certain aspects of the present disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a non-transitory computer-readable medium. Non-transitory computer-readable media includes computer storage media. Storage media may be any available media that can be accessed by a computer. By way of example, and not limitation, such non-transitory computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of non-transitory computer-readable media, or any other medium that can be used to store computer executable code in the form of instructions or data structures that can be accessed by a computer.

In general, this disclosure describes techniques for having a distributed graphics processing pipeline across multiple devices, improving the coding of graphical content, and/or reducing the load of a processing unit (i.e., any processing unit configured to perform one or more techniques described herein, such as a graphics processing unit (GPU)). For example, this disclosure describes techniques for graphics processing in communication systems. Other example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "video," "graphical content," "image," and vice versa. This is true regardless of whether the terms are being used as an adjective, noun, or other part of speech. For example, reference to a "content coder" may include reference to a "video coder," "graphical content coder," or "image coder," and reference to a "video coder," "graphical content coder," or "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended)

As referenced herein, a first component (e.g., a processing unit) may provide content, such as graphical content, to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

The mobile gaming market is becoming one of the most important markets in the mobile world. In this market, users care greatly about game performance. Video game applications running on a mobile device may sacrifice game performance to improve battery life by controlling power consumption when a user plays a game on the mobile device. A successful gaming application running on a mobile device provides exceptional game performance, while reducing power consumption to improve battery life of the mobile device.

Mobile extended reality (XR) gaming devices are part of a relatively new mobile gaming market that is gaining significant traction. These XR mobile gaming device are implemented with integrated connectivity solutions to support various communications applications. During operation, these integrated connectivity solutions engage in periodic activities, such as paging (e.g., new radio (NR)/5G/Sub-6), connected mode discontinuous reception (CDRx), a delivery traffic indication message (DTIM), scan, and sniff. Supporting these integrated connectivity solutions involves the allocation of increased cache memory resources to enable successfully operation of mobile XR gaming devices.

Additionally, mobile XR gaming devices are configured to enter a deep sleep state for conversing battery power. Unfortunately, the activities of the connectivity solutions may cause frequent exits from the deep sleep state. In particular, specified system cache flushing and rebuilding policies in response to exiting the deep sleep state are especially problem due to increased system cache memory provided to enable operation of mobile XR gaming devices. As a result, a reduced power consumption technique for providing an improved user experience without sacrificing game performance when operating an XR mobile gaming device due to system cache flushing and rebuilding policies in response to exiting a deep sleep state is desired.

Some aspects of the present disclosure provide a number of advantages and solutions for mobile gaming, such as providing improved XR mobile gaming device battery life. These aspects of the present disclosure rely on a smart extended reality data of usage (XR-DOU) framework that reduces power consumption and improves battery life of the mobile device. Some aspects of the present disclosure are directed to a live cache and memory management ($LCM^2$) framework, which helps to improve a user experience without sacrificing game performance when operating an XR mobile gaming device. Some aspects of the present disclosure detect an XR specific standby scenario using a combination of elemental feedback of "no-user eye presence/close state" as a trigger point and a smart assessment of hysteresis/history periodicity associated with repeated entry/exit due to incoming message/notification/XR specific wakeups/system exit from regular sleep cycles. This smart assessment is compared against a desired threshold as part of a statistical evaluation for enabling the live cache and memory management ($LCM^2$) framework to overcome the noted challenges.

FIG. 1 illustrates an example implementation of a system-on-chip (SoC) 100, having a graphics processing unit (GPU) to support extended reality (XR) gaming applications, in accordance with certain aspects of the present disclosure.

The host SoC 100 includes processing blocks tailored to specific functions, such as a connectivity block 110. The connectivity block 110 may include fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 100 includes various processing units that support multi-threaded operation. For the configuration shown in FIG. 1, the SoC 100 includes a multi-core central processing unit (CPU) 102, a graphics processor unit (GPU) 104, a digital signal processor (DSP) 106, and a neural processor unit (NPU) 108. The SoC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multi-media engine 112 support various functions such as video, audio, graphics, extended reality (XR) gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

In some aspect of the present disclosure, the instructions loaded into the multi-core CPU 102 may include program code to detect entry of a mobile device into a deep sleep state. The instructions loaded into the multi-core CPU 102 may also include program code to monitor a hysteresis counter of entry into the deep sleep state relative to a time period of the mobile device in the deep sleep state to compute a hysteresis statistical threshold. The instructions loaded into the multi-core CPU 102 may also include program code to compare the hysteresis statistical threshold to a threshold configuration value. The instructions loaded into the multi-core CPU 102 may also include program code to adjust memory management of the mobile device and/or frequency scaling when the hysteresis statistical threshold is greater than the threshold configuration value.

Figure 2:
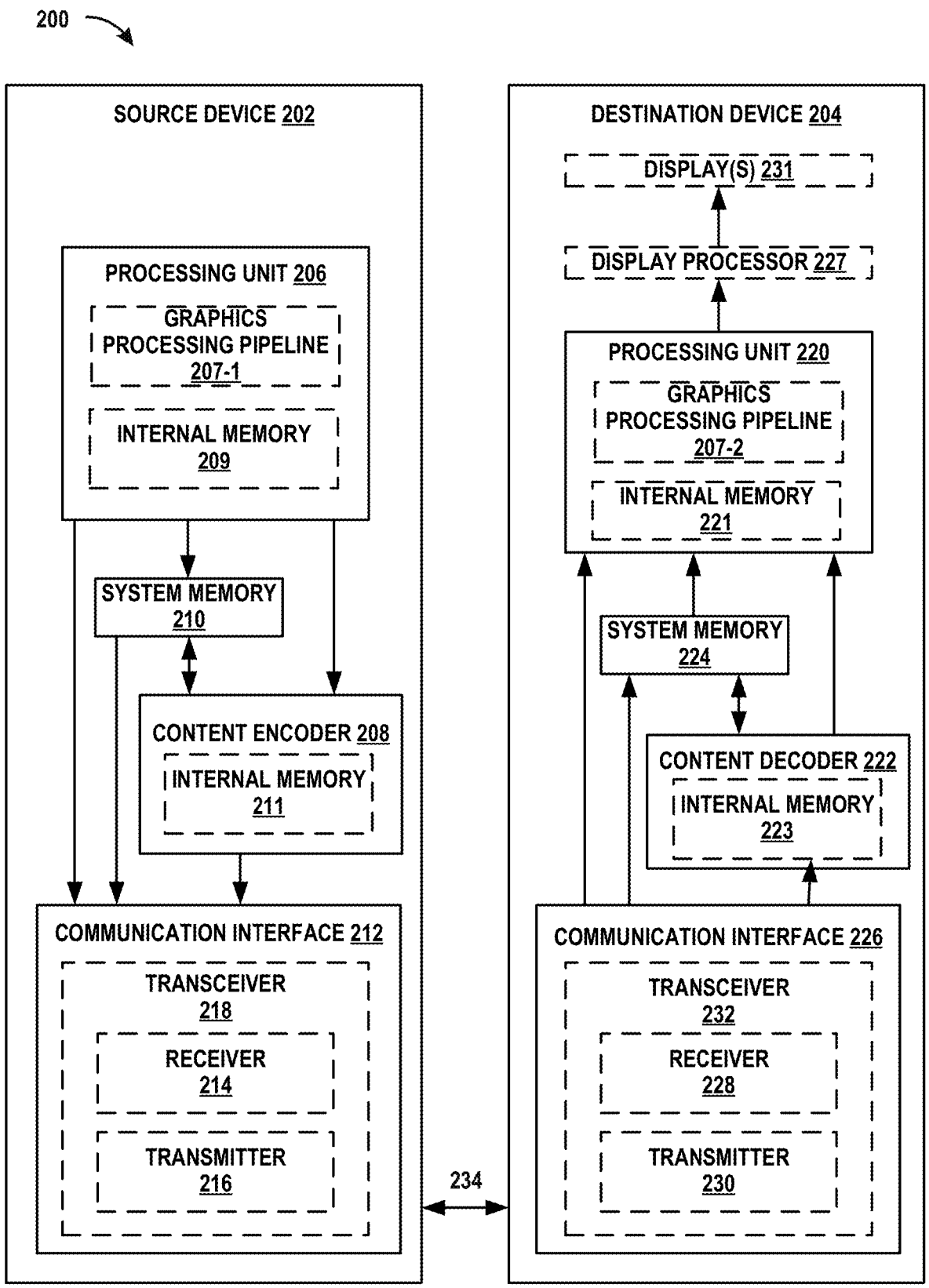
FIG. 2 is a block diagram that illustrates an example content generation and coding system to implement extended reality (XR) gaming applications, in accordance with aspects of the present disclosure.

FIG. 2 is a block diagram that illustrates an example extended reality (XR) gaming system 200 configured to implement extended reality (XR) gaming applications, according to aspects of the present disclosure. The XR gaming system 200 includes a source device 202 and a destination device 204. In accordance with the techniques described herein, the source device 202 may be configured to encode, using the content encoder 208, graphical content generated by the processing unit 206 prior to transmission to the destination device 204. The content encoder 208 may be configured to output a bitstream having a bit rate. The processing unit 206 may be configured to control and/or influence the bit rate of the content encoder 208 based on how the processing unit 206 generates graphical content.

The source device 202 may include one or more components (or circuits) for performing various functions described herein. The destination device 204 may include one or more components (or circuits) for performing various functions described herein. In some examples, one or more components of the source device 202 may be components of a system-on-chip (SoC). Similarly, in some examples, one or more components of the destination device 204 may be components of an SoC.

The source device 202 may include one or more components configured to perform one or more techniques of this disclosure. In the example shown, the source device 202 may include a processing unit 206, a content encoder 208, a system memory 210, and a communication interface 212.

The processing unit 206 may include an internal memory 209. The processing unit 206 may be configured to perform graphics processing, such as in a graphics processing pipeline 207-1. The content encoder 208 may include an internal memory 211.

Memory external to the processing unit 206 and the content encoder 208, such as system memory 210, may be accessible to the processing unit 206 and the content encoder 208. For example, the processing unit 206 and the content encoder 208 may be configured to read from and/or write to external memory, such as the system memory 210. The processing unit 206 and the content encoder 208 may be communicatively coupled to the system memory 210 over a bus. In some examples, the processing unit 206 and the content encoder 208 may be communicatively coupled to each other over the bus or a different connection.

The content encoder 208 may be configured to receive graphical content from any source, such as the system memory 210 and/or the processing unit 206. The system memory 210 may be configured to store graphical content generated by the processing unit 206. For example, the processing unit 206 may be configured to store graphical content in the system memory 210. The content encoder 208 may be configured to receive graphical content (e.g., from the system memory 210 and/or the processing unit 206) in the form of pixel data. Otherwise described, the content encoder 208 may be configured to receive pixel data of graphical content produced by the processing unit 206. For example, the content encoder 208 may be configured to receive a value for each component (e.g., each color component) of one or more pixels of graphical content. As an example, a pixel in the RGB color space may include a first value for the red component, a second value for the green component, and a third value for the blue component.

The internal memory 209, the system memory 210, and/or the internal memory 211 may include one or more volatile or non-volatile memories or storage devices. In some examples, internal memory 209, the system memory 210, and/or the internal memory 211 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 209, the system memory 210, and/or the internal memory 211 may be a non-transitory storage medium according to some examples. The term "non-transitory" may indicate that the storage medium is not embodied in a carrier wave or a propagated signal. However, the term "non-transitory" should not be interpreted to mean that internal memory 209, the system memory 210, and/or the internal memory 211 is non-movable or that its contents are static. As one example, the system memory 210 may be removed from the source device 202 and moved to another device. As another example, the system memory 210 may not be removable from the source device 202.

The processing unit 206 may be a central processing unit (CPU), a graphics processing unit (GPU), a general purpose GPU (GPGPU), or any other processing unit that may be configured to perform graphics processing. In some examples, the processing unit 206 may be integrated into a motherboard of the source device 202. In some examples, the processing unit 206 may be present on a graphics card that is installed in a port in a motherboard of the source device 202, or may be otherwise incorporated within a peripheral device configured to interoperate with the source device 202.

The processing unit 206 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 206 may store instructions for the software in a suitable, non-transitory computer-readable storage medium (e.g., internal memory 209), and may execute the instructions in hardware using one or more processors to perform the techniques of this disclosure. Any of the foregoing (including hardware, software, a combination of hardware and software, etc.) may be considered to be one or more processors.

The content encoder 208 may be any processing unit configured to perform content encoding. In some examples, the content encoder 208 may be integrated into a motherboard of the source device 202. The content encoder 208 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content encoder 208 may store instructions for the software in a suitable, non-transitory computer-readable storage medium (e.g., internal memory 211), and may execute the instructions in hardware using one or more processors to perform the techniques of this disclosure. Any of the foregoing (including hardware, software, a combination of hardware and software, etc.) may be considered to be one or more processors.

The communication interface 212 may include a receiver 214 and a transmitter 216. The receiver 214 may be configured to perform any receiving function described herein with respect to the source device 202. For example, the receiver 214 may be configured to receive information from the destination device 204, which may include a request for content. In some examples, in response to receiving the request for content, the source device 202 may be configured to perform one or more techniques described herein, such as produce or otherwise generate graphical content for delivery to the destination device 204. The transmitter 216 may be configured to perform any transmitting function described herein with respect to the source device 202. For example, the transmitter 216 may be configured to transmit encoded content to the destination device 204, such as encoded graphical content produced by the processing unit 206 and the content encoder 208 (i.e., the graphical content is produced by the processing unit 206, which the content encoder 208 receives as input to produce or otherwise generate the encoded graphical content). The receiver 214 and the transmitter 216 may be combined into a transceiver 218. In such examples, the transceiver 218 may be configured to perform any receiving function and/or transmitting function described herein with respect to the source device 202.

The destination device 204 may include one or more components configured to perform one or more techniques of this disclosure. In the example shown, the destination device 204 may include a processing unit 220, a content decoder 222, a system memory 224, a communication interface 226, and one or more displays 231. Reference to the displays 231 may refer to the one or more displays 231. For example, the displays 231 may include a single display or a plurality of displays. The displays 231 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 220 may include an internal memory 221. The processing unit 220 may be configured to perform graphics processing, such as in a graphics processing pipeline 207-2. The content decoder 222 may include an internal memory 223. In some examples, the destination device 204 may include a display processor, such as the display processor 227, to perform one or more display processing techniques on one or more frames generated by the processing unit 220 before presentment by the one or more displays 231. The display processor 227 may be configured to perform display processing. For example, the display processor 227 may be configured to perform one or more display processing techniques on one or more frames generated by the processing unit 220. The one or more displays 231 may be configured to display content that was generated using decoded content. For example, the display processor 227 may be configured to process one or more frames generated by the processing unit 220, where the one or more frames are generated by the processing unit 220 by using decoded content that was derived from encoded content received from the source device 202. In turn the display processor 227 may be configured to perform display processing on the one or more frames generated by the processing unit 220. The one or more displays 231 may be configured to display or otherwise present frames processed by the display processor 227. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 220 and the content decoder 222, such as system memory 224, may be accessible to the processing unit 220 and the content decoder 222. For example, the processing unit 220 and the content decoder 222 may be configured to read from and/or write to external memory, such as the system memory 224. The processing unit 220 and the content decoder 222 may be communicatively coupled to the system memory 224 over a bus. In some examples, the processing unit 220 and the content decoder 222 may be communicatively coupled to each other over the bus or a different connection.

The content decoder 222 may be configured to receive graphical content from any source, such as the system memory 224 and/or the communication interface 226. The system memory 224 may be configured to store received encoded graphical content, such as encoded graphical content received from the source device 202. The content decoder 222 may be configured to receive encoded graphical content (e.g., from the system memory 224 and/or the communication interface 226) in the form of encoded pixel data. The content decoder 222 may be configured to decode encoded graphical content.

The internal memory 221, the system memory 224, and/or the internal memory 223 may include one or more volatile or non-volatile memories or storage devices. In some examples, internal memory 221, the system memory 224, and/or the internal memory 223 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 221, the system memory 224, and/or the internal memory 223 may be a non-transitory storage medium according to some examples. The term "non-transitory" may indicate that the storage medium is not embodied in a carrier wave or a propagated signal. However, the term "non-transitory" should not be interpreted to mean that internal memory 221, the system memory 224, and/or the internal memory 223 is non-movable or that its contents are static. As one example, the system memory 224 may be removed from the destination device 204 and moved to another device. As another example, the system memory 224 may not be removable from the destination device 204.

The processing unit 220 may be a central processing unit (CPU), a graphics processing unit (GPU), a general purpose GPU (GPGPU), or any other processing unit that may be configured to perform graphics processing. In some examples, the processing unit 220 may be integrated into a motherboard of the destination device 204. In some examples, the processing unit 220 may be present on a graphics card that is installed in a port in a motherboard of the destination device 204, or may be otherwise incorporated within a peripheral device configured to interoperate with the destination device 204.

The processing unit 220 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 220 may store instructions for the software in a suitable, non-transitory computer-readable storage medium (e.g., internal memory 221), and may execute the instructions in hardware using one or more processors to perform the techniques of this disclosure. Any of the foregoing (including hardware, software, a combination of hardware and software, etc.) may be considered to be one or more processors.

The content decoder 222 may be any processing unit configured to perform content decoding. In some examples, the content decoder 222 may be integrated into a motherboard of the destination device 204. The content decoder 222 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the content decoder 222 may store instructions for the software in a suitable, non-transitory computer-readable storage medium (e.g., internal memory 223), and may execute the instructions in hardware using one or more processors to perform the techniques of this disclosure. Any of the foregoing (including hardware, software, a combination of hardware and software, etc.) may be considered to be one or more processors.

The communication interface 226 may include a receiver 228 and a transmitter 230. The receiver 228 may be configured to perform any receiving function described herein with respect to the destination device 204. For example, the receiver 228 may be configured to receive information from the source device 202, which may include encoded content, such as encoded graphical content produced or otherwise generated by the processing unit 206 and the content encoder 208 of the source device 202 (i.e., the graphical content is produced by the processing unit 206, which the content encoder 208 receives as input to produce or otherwise generate the encoded graphical content). As another example, the receiver 228 may be configured to receive position information from the source device 202, which may be encoded or unencoded (i.e., not encoded). In some examples, the destination device 204 may be configured to decode encoded graphical content received from the source device 202 in accordance with the techniques described herein. For example, the content decoder 222 may be configured to decode encoded graphical content to produce or otherwise generate decoded graphical content. The processing unit 220 may be configured to use the decoded graphical content to produce or otherwise generate one or more frames for presentment on the one or more displays 231. The transmitter 230 may be configured to perform any transmitting function described herein with respect to the destination device 204. For example, the transmitter 230 may be configured to transmit information to the source device 202, which may include a request for content. The receiver 228 and the transmitter 230 may be combined into a transceiver 232. In such examples, the transceiver 232 may be configured to perform any receiving function and/or transmitting function described herein with respect to the destination device 204.

The content encoder 208 and the content decoder 222 of XR gaming system 200 represent examples of computing components (e.g., processing units) that may be configured to perform one or more techniques for encoding content and decoding content in accordance with various examples described in this disclosure, respectively. In some examples, the content encoder 208 and the content decoder 222 may be configured to operate in accordance with a content coding standard, such as a video coding standard, a display stream compression standard, or an image compression standard.

As shown in FIG. 2, the source device 202 may be configured to generate encoded content. Accordingly, the source device 202 may be referred to as a content encoding device or a content encoding apparatus. The destination device 204 may be configured to decode the encoded content generated by source device 202. Accordingly, the destination device 204 may be referred to as a content decoding device or a content decoding apparatus. In some examples, the source device 202 and the destination device 204 may be separate devices, as shown. In other examples, source device 202 and destination device 204 may be on or part of the same computing device. In either example, a graphics processing pipeline may be distributed between the two devices. For example, a single graphics processing pipeline may include a plurality of graphics processes. The graphics processing pipeline 207-1 may include one or more graphics processes of the plurality of graphics processes. Similarly, graphics processing pipeline 207-2 may include one or more processes graphics processes of the plurality of graphics processes. In this regard, the graphics processing pipeline 207-1 concatenated or otherwise followed by the graphics processing pipeline 207-2 may result in a full graphics processing pipeline. Otherwise described, the graphics processing pipeline 207-1 may be a partial graphics processing pipeline and the graphics processing pipeline 207-2 may be a partial graphics processing pipeline that, when combined, result in a distributed graphics processing pipeline.

In some examples, a graphics process performed in the graphics processing pipeline 207-1 may not be performed or otherwise repeated in the graphics processing pipeline 207-

2. For example, the graphics processing pipeline 207-1 may include receiving first position information corresponding to a first orientation of a device. The graphics processing pipeline 207-1 may also include generating first graphical content based on the first position information. Additionally, the graphics processing pipeline 207-1 may include generating motion information for warping the first graphical content. The graphics processing pipeline 207-1 may further include encoding the first graphical content. Also, the graphics processing pipeline 207-1 may include providing the motion information and the encoded first graphical content. The graphics processing pipeline 207-2 may include providing first position information corresponding to a first orientation of a device. The graphics processing pipeline 207-2 may also include receiving encoded first graphical content generated based on the first position information. Further, the graphics processing pipeline 207-2 may include receiving motion information. The graphics processing pipeline 207-2 may also include decoding the encoded first graphical content to generate decoded first graphical content. Also, the graphics processing pipeline 207-2 may include warping the decoded first graphical content based on the motion information. By distributing the graphics processing pipeline between the source device 202 and the destination device 204, the destination device may be able to, in some examples, present graphical content that it otherwise would not be able to render; and, therefore, could not present. Other example benefits are described throughout this disclosure.

As described herein, a device, such as the source device 202 and/or the destination device 204, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate graphical content, or any device configured to perform one or more techniques described herein.

Source device 202 may be configured to communicate with the destination device 204. For example, destination device 204 may be configured to receive encoded content from the source device 202. In some example, the communication coupling between the source device 202 and the destination device 204 is shown as link 234. Link 234 may comprise any type of medium or device capable of moving the encoded content from source device 202 to the destination device 204.

In the example of FIG. 2, link 234 may comprise a communication medium to enable the source device 202 to transmit encoded content to destination device 204 in real-time. The encoded content may be modulated according to a communication standard, such as a wireless communication protocol, and transmitted to destination device 204. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 202 to the destination device 204. In other examples, link 234 may be a point-to-point connection between source device 202 and destination device 204, such as a wired or wireless display link connection (e.g., an HDMI link, a DisplayPort link, MIPI DSI link, or another link over which encoded content may traverse from the source device 202 to the destination device 204.

In another example, the link 234 may include a storage medium configured to store encoded content generated by the source device 202. In this example, the destination device 204 may be configured to access the storage medium. The storage medium may include a variety of locally-accessed data storage media such as Blu-ray discs, DVDs, CD-ROMs, flash memory, or other suitable digital storage media for storing encoded content.

In another example, the link 234 may include a server or another intermediate storage device configured to store encoded content generated by the source device 202. In this example, the destination device 204 may be configured to access encoded content stored at the server or other intermediate storage device. The server may be a type of server capable of storing encoded content and transmitting the encoded content to the destination device 204.

Devices described herein may be configured to communicate with each other, such as the source device 202 and the destination device 204. Communication may include the transmission and/or reception of information. The information may be carried in one or more messages. As an example, a first device in communication with a second device may be described as being communicatively coupled to or otherwise with the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices are inclusive of more than two devices. For example, a first device may communicatively couple with a second device and the first device may communicatively couple with a third device. In such an example, the first device may be a server.

With reference to FIG. 2, the source device 202 may be described as being communicatively coupled to the destination device 204. In some examples, the term "communicatively coupled" may refer to a communication connection, which may be direct or indirect. The link 234 may, in some examples, represent a communication coupling between the source device 202 and the destination device 204. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. For example, a device, such as the source device 202, may be configured to unicast, broadcast, multicast, or otherwise transmit information (e.g., encoded content) to one or more other devices (e.g., one or more destination devices, which includes the destination device 204). The destination device 204 in this example may be described as being communicatively coupled with each of the one or more other devices. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the source device 202 and the destination device 204, may be configured to operate in accordance with one or more communication protocols. For example, the source device 202 may be configured to communicate with (e.g., receive information from and/or transmit information to) the destination device 204 using one or more communication protocols. In such an example, the source device 202 may be described as communicating with the destination device 204 over a connection. The connection may be compliant or otherwise be in accordance with a communication protocol. Similarly, the destination device 204 may be configured to communicate with (e.g., receive information from and/or transmit information to) the source device 202 using one or more communication protocols. In such an example, the destination device 204 may be described as communicating with the source device 202 over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, 5G, or 6G.

With reference to FIG. 2, the content encoder 208 may be configured to encode graphical content. In some examples, the content encoder 208 may be configured to encode graphical content as one or more video frames of extended reality (XR) content. When the content encoder 208 encodes content, the content encoder 208 may generate a bitstream. The bitstream may have a bit rate, such as bits/time unit, where time unit is any time unit, such as second or minute. The bitstream may include a sequence of bits that form a coded representation of the graphical content and associated data. To generate the bitstream, the content encoder 208 may be configured to perform encoding operations on pixel data, such as pixel data corresponding to a shaded texture atlas. For example, when the content encoder 208 performs encoding operations on image data (e.g., one or more blocks of a shaded texture atlas) provided as input to the content encoder 208, the content encoder 208 may generate a series of coded images and associated data. The associated data may include a set of coding parameters such as a quantization parameter (QP).

The mobile gaming market is becoming one of the most important markets in the mobile world. In this market, users care greatly about game performance. Video game applications running on a mobile device may sacrifice game performance to improve battery life by controlling power consumption when a user plays a game on the mobile device. A successful gaming application running on a mobile device provides exceptional game performance, while reducing power consumption to improve battery life of the mobile device.

Mobile extended reality (XR) gaming devices are part of a relatively new mobile gaming market that is gaining significant traction. Unfortunately, the power consumption of these mobile XR gaming devices is a significant drain on a battery of the mobile XR gaming device. As a result, a longer battery life is an import feature for providing a user experience without sacrificing game performance when operating the XR mobile gaming device. A reduced power consumption technique for providing an improved user experience without sacrificing game performance when operating an XR mobile gaming device is desired.

As shown in FIG. 1, a mobile gaming device may be implemented using the SoC 100, including the memory 118, which provides a significant amount of volatile memory and nonvolatile memory to achieve improved performance and power. For example, the SoC 100 is implemented with a system cache (e.g., on order of 16 megabytes (MB) or 32 MB), including nonvolatile memory (NVM), such as universal flash storage (UFS). While initial versions of artificial reality (AR)/virtual reality (VR) type products were implemented using a 1 MB last level cache subsystem (LLCC), the memory 118 of the SoC 100 may be configured with 32 MB LLCC, including 6 MB of scratch pad memory to support AR/VR type products. As described, these AR/VR product lines are collectively referred to as extended reality (XR) product lines.

Figure 3A:
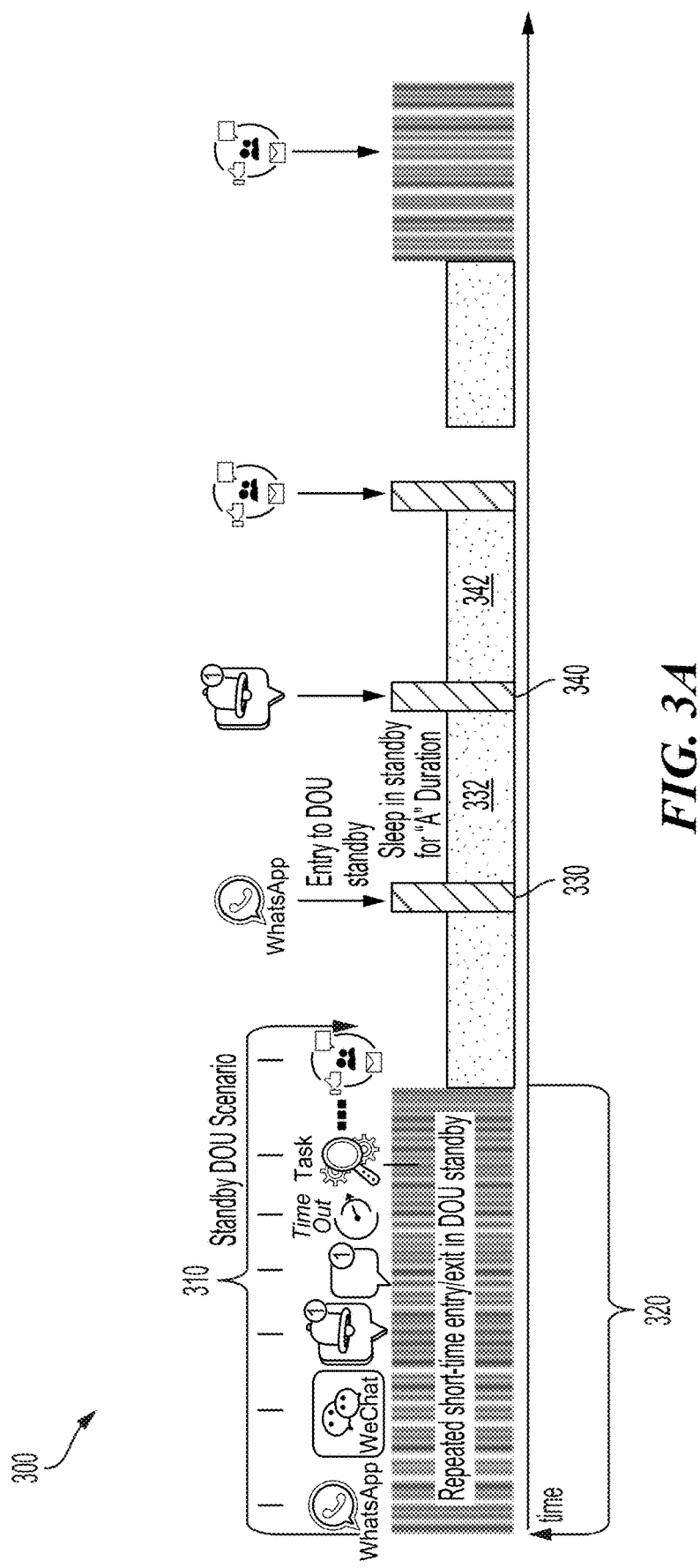
FIGS. 3A and 3B are timing diagrams illustrating standby data of usage (DOU) scenarios incurred by an extended reality (XR) mobile gaming device during an XR standby power mode.
Figure 3B:
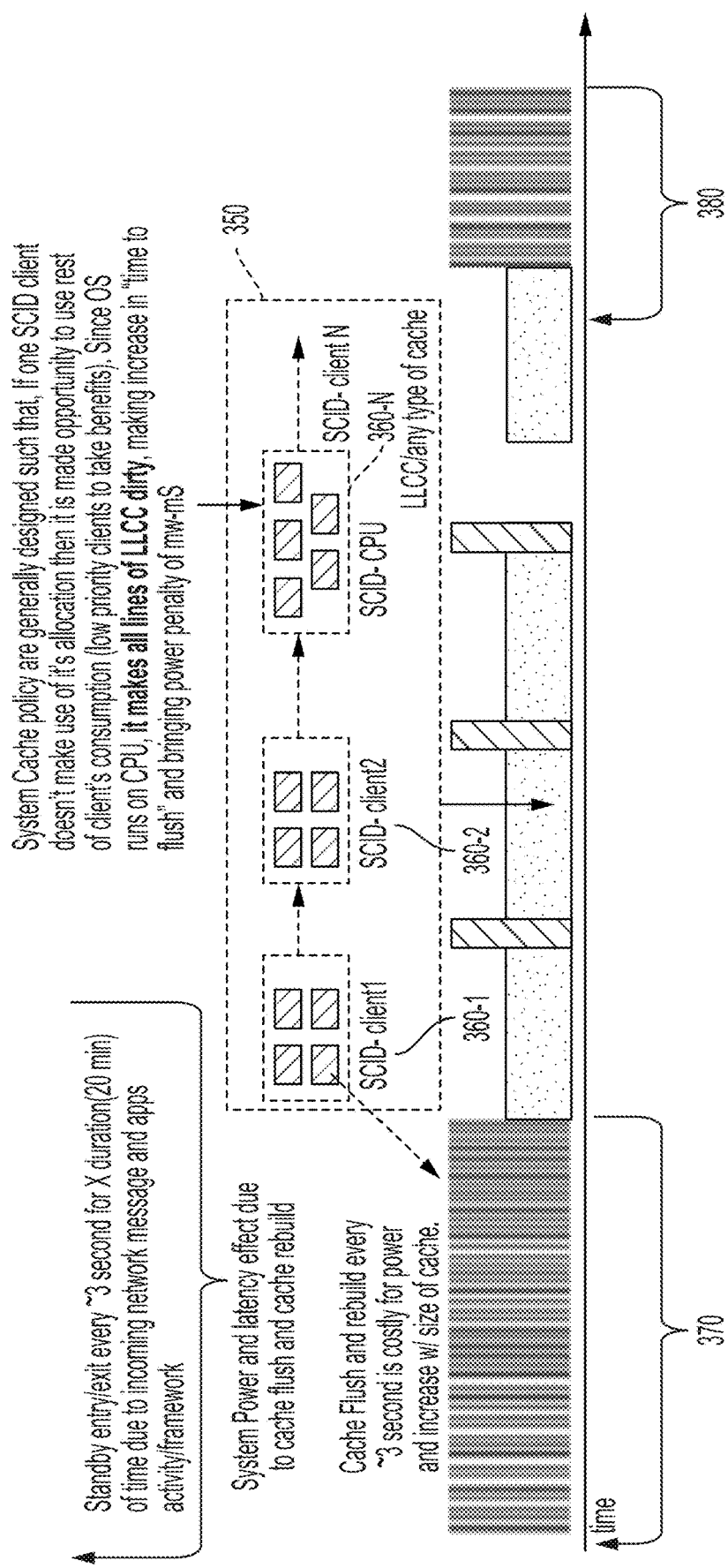

FIGS. 3A and 3B show a timing diagram 300 illustrating standby data of usage (DOU) scenarios incurred by an extended reality (XR) mobile gaming device during an XR standby power mode. As shown in FIG. 3A, the XR mobile gaming device is implemented with integrated connectivity solutions to support various communications applications. During operation, these integrated connectivity solutions engage in periodic activities, such as paging (e.g., new radio (NR)/5G/Sub-6), connected mode discontinuous reception (CDRx), a delivery traffic indication message (DTIM), scan, and sniff.

Unfortunately, when these XR mobile gaming devices transition to an XR standby DOU power mode 310, the XR gaming device incurs a period 320 of repeated short-time entry/exit after the initial entry into the XR standby DOU power mode 310. In this example, entry and exit into the XR standby DOU power mode 310 occurs every three seconds for a significant duration (e.g., 20 minutes) of time due to incoming network messages and application activity/framework. This example also illustrates a subsequent entry into a DOU standby 330, followed by a sleep period 332 of a duration A. Additionally, a subsequent entry into a DOU standby 340, followed by a sleep period 342 is shown.

As shown in FIG. 3B, a periodic wakeup due to the integrated connectivity solutions during the period 320 results in the repeated short-time entry/exit after the initial entry into the XR standby DOU power mode 310. Additionally, the period 320 of repeated short-time entry/exit after the initial entry into the XR standby DOU power mode 310 invokes a massive system cache flush and rebuild activity, which also powers up and powers down the non-volatile UFS memories. In this example, a system cache 350 (e.g., LLCC) includes system cache identification (SCID) clients 360 (360-1, 360-2, . . . , 360-N), in which one of the SCID clients 360 is the CPU.

A policy of the system cache 350 may dictate that if one of the SCID clients 360 does not utilize an allocated portion of the system cache 350, the others of the SCID clients 360 utilize the allocated portion. Because the operating system (OS) runs on the CPU (e.g., SCID-CPU), the SCID-CPU client sets all lines of the system cache 350 to dirty, resulting in an increase in a cache flush time. Additionally, the increase in the flush time leads to a significant power penalty. For example, a period 370 of repeated cache flushing and rebuilding occurs every three seconds for a significant portion of time, resulting in wasted system power and increased latency, which is exacerbated as the system cache 350 grows. Nevertheless, incoming messages 380 received from the integrated connectivity solutions are stored in the memory 118 (e.g., double data rate (DDR) memory) prior to rebuilding of the system cache 350. Because the incoming messages 380 are new messages/packets, the incoming messages 380 are stored in the memory 118 (FIG. 1) and are saved without having to flush and rebuild the system cache 350 during the XR standby DOU power mode 310 (e.g., a deep sleep state).

In particular, the period 370 of repeated system cache flush and rebuild activity involves both a performance penalty and a power penalty. The performance penalty and the power penalty correspond to a flush time cost and a flush power cost, which are directly proportional to the size of system cache 350. A large size of the system cache 350 results in an increased flush time, which negatively impacts latency and significantly increases the power cost. For example, considering a modem CDRx cycle and assuming paging occurs periodically (e.g, approximately every 20 milliseconds (ms)), then due to the higher flush time overhead, the mobile gaming device SoC defers to the same amount of time as the CDRx timeline, which impacts the modem timeline by preventing entry into the CDRx mode. Additionally, the external nonvolatile memories (e.g., UFS, embedded multimedia car (eMMC) flash memory, etc.) of the mobile gaming device SoC also pay the penalty of reduced life cycles due to lost deep sleep cycles.

These external nonvolatile memories are configured with low power modes to enable deepest sleep states based on idle cycles, before finally transitioning to an off state. Currently, UFS memory enters a deep sleep state in response to a system DOU/suspend state, in which the UFS is transitioned to an OFF state (e.g., level=5, referred to as a UFS shutdown state or OFF state) which saves the rock bottom sleep current (RBSC) power. As shown FIG. 3A, each incoming message (e.g., WhatsApp, WeChat, etc.) causes a wakeup of the UFS, which results in re-initialization steps, involving processing of events for each small computer system interface (SCSI) device (e.g., close to eight events) resulting in increased power consumption. This processing of events results in additional overhead/workload processing from user events (Uevent) monitor (UeventD). Additionally, processing of these events results in up-migration of the user event monitor to a golden CPU, leading to a power impact across the different SOCs. This user event processing activity collectively leads to a considerable power impact in the noted standby DOU power scenario.

TABLE 1

| | Level 5 vs. Level 3 Power Comparisons | | | | |
|---|---|---|---|---|---|
| Use cases/ power | Saving from level = 5 compared to level = 3 | Message/20 sec level = 5 (mA) | Message/20 sec level = 3 (mA) | Message/30 sec level = 5 (mA) | Message/30 sec level = 3 (mA) |
| RBSC | 100 uA-250 uA | NA | NA | NA | NA |
| WhatsApp | No saving but power impact | 44.29 | 38.09 | TBD | TBD |
| WeChat | No saving but power impact | TBD | TBD | 25.50 | 20.96 |

Table 1 illustrates possible power savings by using a Level 3 sleep state to delay entry of the UFS into the Level 5 deep sleep state (e.g., a sleep state level). For example, for WhatsApp, an amount of current is 44.29 milliamps (mA) in Level 5 sleep state, compared to a reduced current of 38.09 mA in the Level 3 sleep state. Similarly, for WeChat, an amount of current is 25.50 mA in Level 5 sleep state, compared to a reduced current of 20.96 mA in the Level 3 sleep state.

Additionally, a cache flush time and overhead due to operation of the system cache 350 caused by the standby DOU power state may be calculated as follows based on a 32 MB size of the system cache 350. First, a number of cache lines (CLs) to flush is approximately 262144 cache lines (=32 ways*8192 sets, assuming a worst case in which all lines of the system cache 350 are dirty lines). Additionally, a number of cycles to flush one cache line is 4 cycles. As a result, a total number of cache flush cycles is approximately 1048576 (=4*262144). Assuming a clock pulse at 150 MHz=1/150=6.7 ns, the time taken to complete a flush of the system cache is approximately complete is approximately 7.025 ms (=6.7 ns*1048576). In practice, however, a memory microcontroller (MC) supports half the bandwidth of the system cache 350. As a result, the total time to flush the system cache 350 is approximately 14.05 ms (=2*7.025 ms).

TABLE 2

Flush Overhead Based on Operation Frequency Lookup

| MC | SHUB | MC FREQ(MHz) | SHUB FREQ(MHz) | Time(ms) |
|---|---|---|---|---|
| 1 | 1 | 200 | 150 | 42 |
| 3 | 1 | 547.2 | 150 | 15.4 |
| 3 | 2 | 547.2 | 300 | 15.4 |
| 5 | 2 | 768 | 300 | 11.2 |
| 6 | 2 | 1017 | 300 | 8.3 |
| 8 | 2 | 1555 | 300 | 7 |
| 5 | 3 | 768 | 466 | 11.1 |
| 6 | 3 | 1017 | 466 | 8.3 |
| 8 | 3 | 1555 | 466 | 5.5 |
| 5 | 4 | 768 | 600 | 11.1 |
| 6 | 4 | 1017 | 600 | 8.3 |
| 8 | 4 | 1555 | 600 | 5.5 |
| 8 | 5 | 1555 | 806 | 5.5 |

Table 2 illustrates flush overhead based on an operation frequency of a memory microcontroller (e.g., double data rate (DDR) microcontroller (MC)) and a system cache controller (SHUB). As shown in the first row of Table 2, assuming a system default operation of the MC at 200 MHz and the SHUB at 150 MHz, the total time to perform a cache flush is 42 ms. Assuming paging occurs periodically (approximately every 20 ms) for the integrated connectivity solutions, the 42 ms flush time impacts a timeline of the integrated connectivity solutions by preventing entry into an idle state (e.g, CDRx, discontinuous reception (DRX), etc.). As shown in Table 2, increasing the frequency of the MC and the SHUB could enable entry into an idle state by reducing the flush time (e.g., 5.5 ms at a highest frequency from Table 2). A solution to improve power and performance without degrading a performance matrix and latency specification for providing a competitive edge in standby DOU power mode is desired. A further solution to provide a latency improvement with the modem and connectivity solutions to accommodate the XR technology area as cache size grows is desired.

Some aspects of the present disclosure are directed to a live cache and memory management (LCM$^2$) framework, which helps to overcome these penalties by using smart methods and schemes. Some aspects of the present disclosure detect an XR specific standby scenario using a combination of elemental feedback of "no-user eye presence/close state" as a trigger point and a smart assessment of hysteresis/history periodicity associated with repeated entry/exit due to incoming messages, notifications, XR specific wakeup, and/or system exit from regular sleep cycles. This smart assessment is compared against a desired threshold as part of a statistical evaluation for enabling the live cache and memory management (LCM$^2$) framework to overcome the noted challenges, according to a process, for example, as shown in FIGS. 4A-9.

Figure 4A:
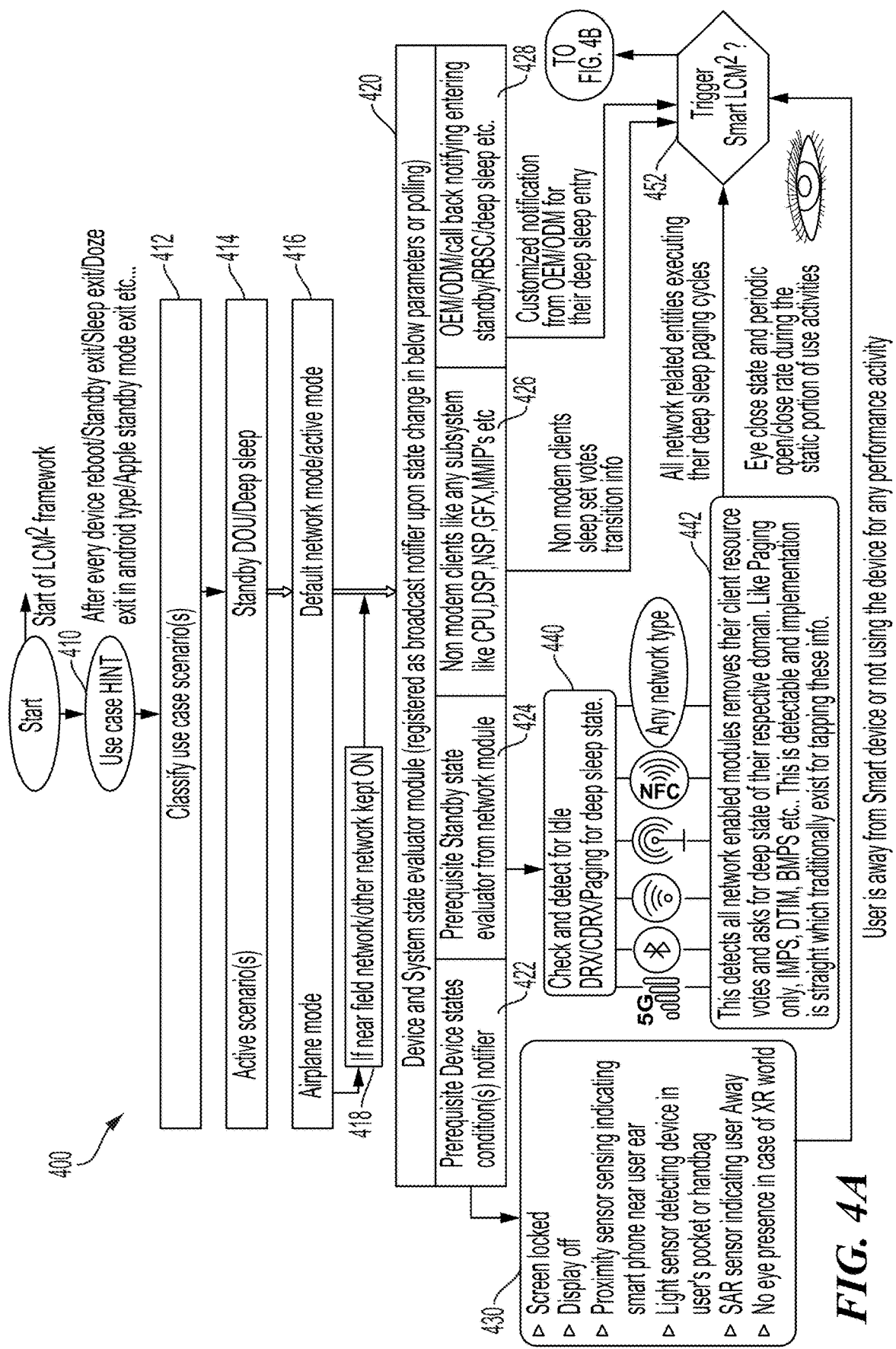
FIGS. 4A and 4B illustrate flowcharts showing a live cache and memory management (LCM$^2$) framework method, according to aspects of the present disclosure.
Figure 4B:
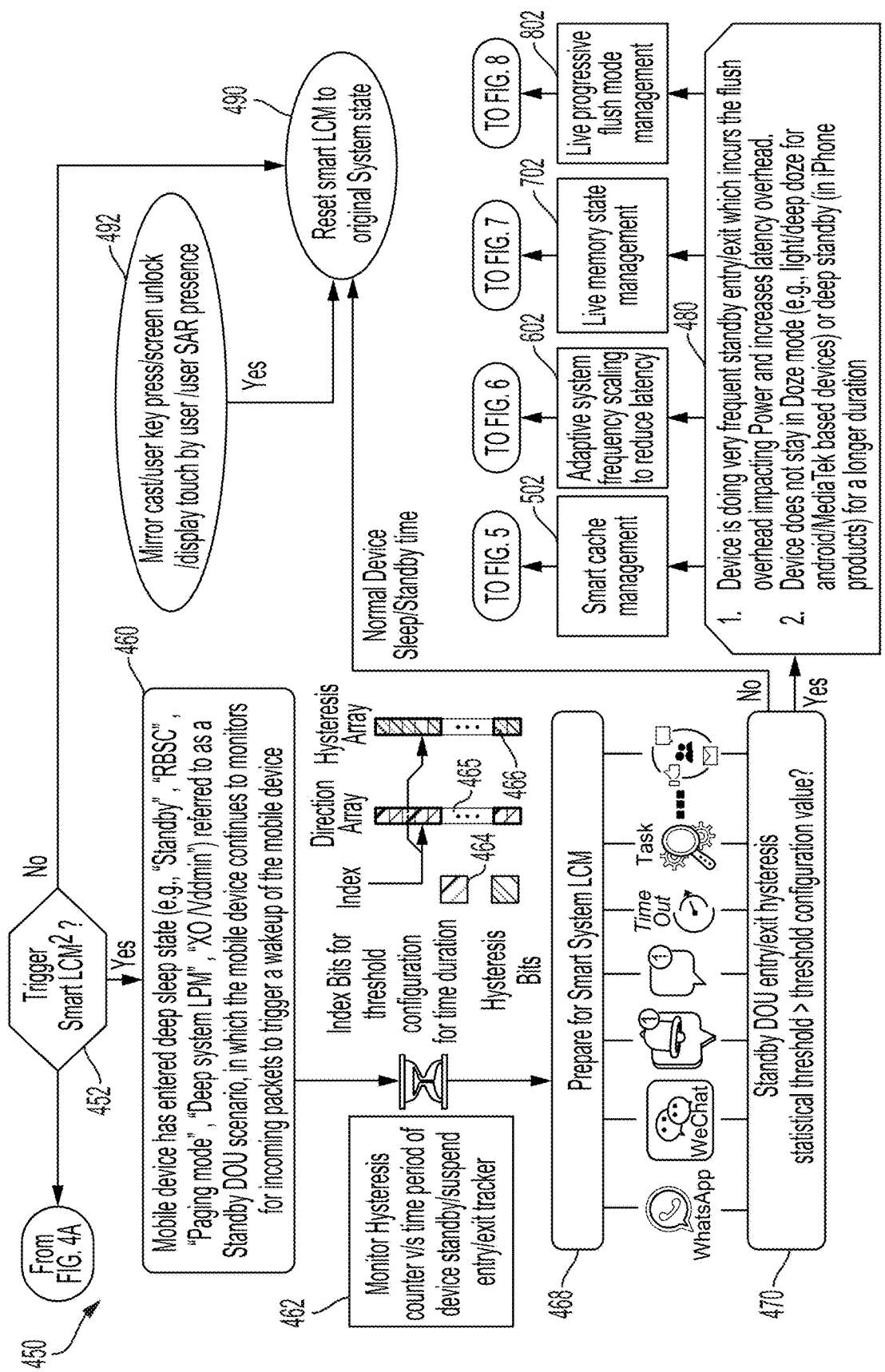

FIGS. 4A and 4B illustrate flowcharts showing a live cache and memory management (LCM$^2$) framework method, according to aspects of the present disclosure. FIG. 4A illustrates a flowchart 400 based on a live cache and memory management framework method. At block 410, each hardware interrupt (HINT) is monitored to detect each device reboot as well an exit from a standby/sleep/doze mode for Android-type devices or an exit from standby mode for Apple-type devices. After each detected device reboot or exit from standby/sleep/doze mode or standby mode, the use case scenarios are classified at block 412, into an active scenario and an inactive scenario at block 414. In this example, the inactive scenario is a standby DOU/deep sleep state, which includes a default network mode/active mode as well as an airplane mode, as determined at block 416. The default network mode/active mode involves applications that mandate a cache flush following an exit from the standby DOU/deep sleep state. Applications that mandate a cache flush may be identified as standby DOU/deep sleep state applications at block 416. When an airplane mode is detected at block 416, at block 418, the integrated connectivity solutions are deactivated unless the device is near a field network or other network, in which case a network mode/active mode is detected.

The flowchart 400 shows a device and system state evaluator module 420, which determines whether the device is expected to enter a standby DOU/deep sleep state to trigger the live cache and memory management framework. The device and system state evaluator module 420 may be registered as a broadcast notifier in response to a state change based on certain parameters or polling. The device and system state evaluator module 420 includes a device state condition notifier 422. At block 430, the device state condition notifier 422 determines whether the device is expected to enter the standby DOU/deep sleep state. In this example, at block 430, the device state condition notifier 422 determines whether the following conditions are true: (1) the device screen is locked; (2) the display is off; (3) a proximity sensor indicates mobile device is near user's ear; (4) a light sensor detects the mobile device in a user pocket or handbag; (5) a synthetic aperture radar (SAR) sensor indicates the user is away; and/or (6) no user eye presence is detected. Based on these conditions, the device state condition notifier 422 determines that the mobile device is expected to enter the standby DOU/deep sleep state and triggers the live cache and memory management framework (LCM$^2$) at block 452.

Additionally, the device and system state evaluator module 420 includes a standby state evaluator 424 of a network module. At block 440, the standby state evaluator 424 determines whether the connectivity solutions are in an idle state (e.g., DRX/CDRX/paging for deep sleep state). At block 442, the standby state evaluator 424 detects all network enabled modules, removes their resource votes, and requests a deep sleep state (e.g., paging, IMPS, DTIM, BMPS, etc.). At block 442, the standby state evaluator 424 detects that all network entities are executing their deep sleep paging cycles and determines whether to trigger the live cache and memory management framework at block 452. Triggering of the live cache and memory management framework at block 452 may be performed by non-modem clients 426 (e.g., CPU, DSP, graphics (GFX), etc.) using sleep votes set to transition into an idle mode. Additionally, triggering of the live cache and memory management framework at block 452 may be performed by original equipment manufacturer (OEM)/original design manufacturer (ODM)/call back 428, providing a customized notification to enter the deep sleep state.

FIG. 4B illustrates a flowchart 450, which further illustrates the live cache and memory management framework method of FIG. 4A, according to aspects of the present disclosure. At block 452, it is determined whether a smart assessment of the live cache memory management framework method is triggered. When the trigger does not occur, control flow branches to block 490, in which the smart live cache memory management is reset to an original state. This may also occur in response to a user action (e.g., mirror cast/user key press/screen unlock/display touch/user SAR presence). At block 460, the smart assessment of the live cache memory management framework method is triggered, which indicates that the device has entered the deep sleep state (e.g., standby, RBSC, paging mode, deep system low power mode (LPM), or a minimum voltage (Vddmin)). As described, in the deep sleep state (e.g., standby DOU state) the device is idle but continues monitoring for received incoming packets to trigger a wakeup.

In some aspects of the present disclosure, the live cache memory management framework method of FIG. 4A detects an XR specific standby scenario using a combination of elemental feedback of "no-user eye presence/close state" as a trigger point. FIG. 4B illustrates a continuation of the cache memory management framework method of FIG. 4A, in which a smart assessment of hysteresis/history periodicity associated with repeated entry/exit of the standby DOU/deep sleep state occurs. In particular, the smart assessment analyzes the repeated entry/exit due to incoming messages, notifications, XR specific wakeups, and system exits from regular sleep cycles. At block 462, a hysteresis counter of entry into the deep sleep state is compared against a time period that tracks entry into and exit from the deep sleep state to compute a hysteresis statistical threshold. Once computed, hysteresis index bits 464 are used to access a direction array 465 to determine a link into a hysteresis array 466 to determine a threshold configuration value based on the time duration. Next, the hysteresis statistical threshold is compared against the threshold configuration value as part of a statistical evaluation for enabling the live cache and memory management (LCM$^2$) framework at block 468.

At block 470, it is determined whether the hysteresis statistical threshold exceeds the threshold configuration value. As noted, the hysteresis statistical threshold may cross the threshold configuration value when frequent incoming messages are received during a short period of time, as monitored in block 462. For example, WhatsApp, WeChat, social media messages, notifications, time updates, background tasks and/or housekeeping tasks may results in frequent incoming received messages during a short period of time, causing frequent exits from the deep sleep state, as determined at block 480. Otherwise, control flow branches to block 490 due to a normal device sleep/standby time. At block 480, the live cache and memory management framework determines the device is performing frequent standby entry/exit, which incurs the noted flush overhead, involving both increased power consumption and increased latency. That is, the device does not remain in a doze mode (e.g., light/deep doze for Android/MediaTek based devices) or deep standby (for iPhone devices) for a sufficient duration, referred to as the deep sleep state.

Figure 5:
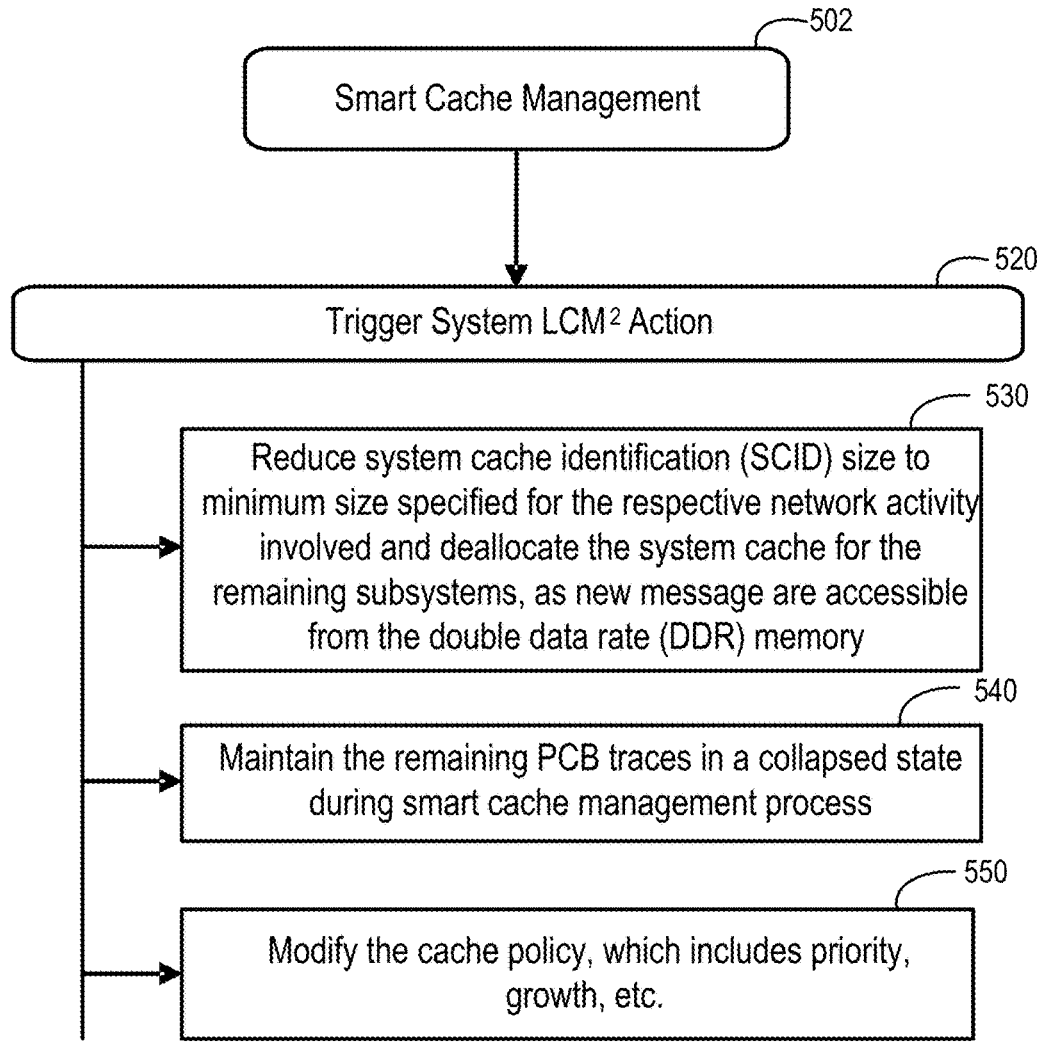
FIG. 5 is a flowchart illustrating a smart cache management process of the live cache memory management framework method of FIGS. 4A and 4B, according to aspects of the present disclosure.
Figure 6:
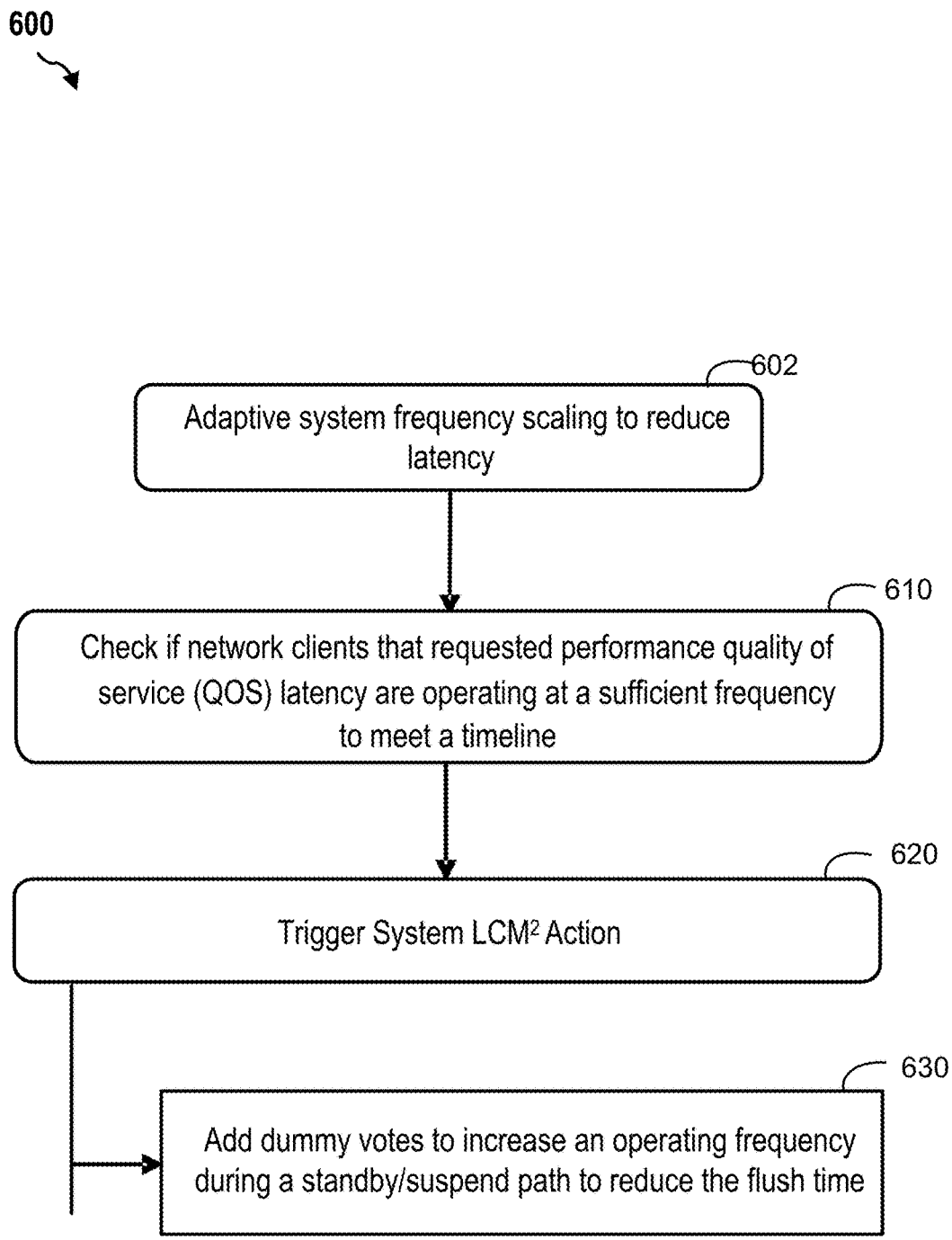
FIG. 6 is a flowchart illustrating an adaptive system frequency scaling process of the live cache memory management framework method of FIGS. 4A and 4B, according to aspects of the present disclosure.
Figure 7:
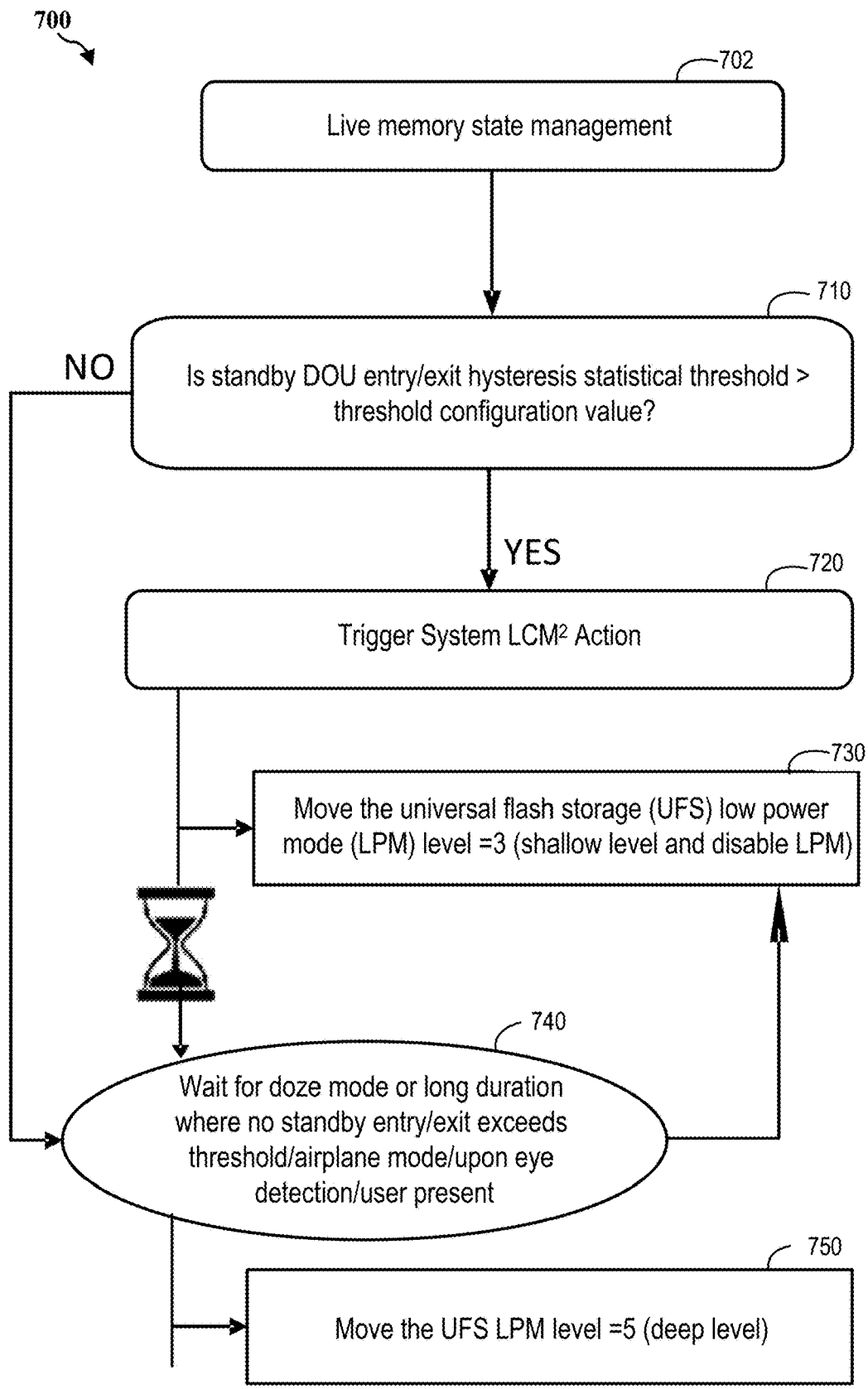
FIG. 7 is a flowchart illustrating a live memory state management process of the live cache memory management framework method of FIGS. 4A and 4B, according to aspects of the present disclosure.
Figure 8:
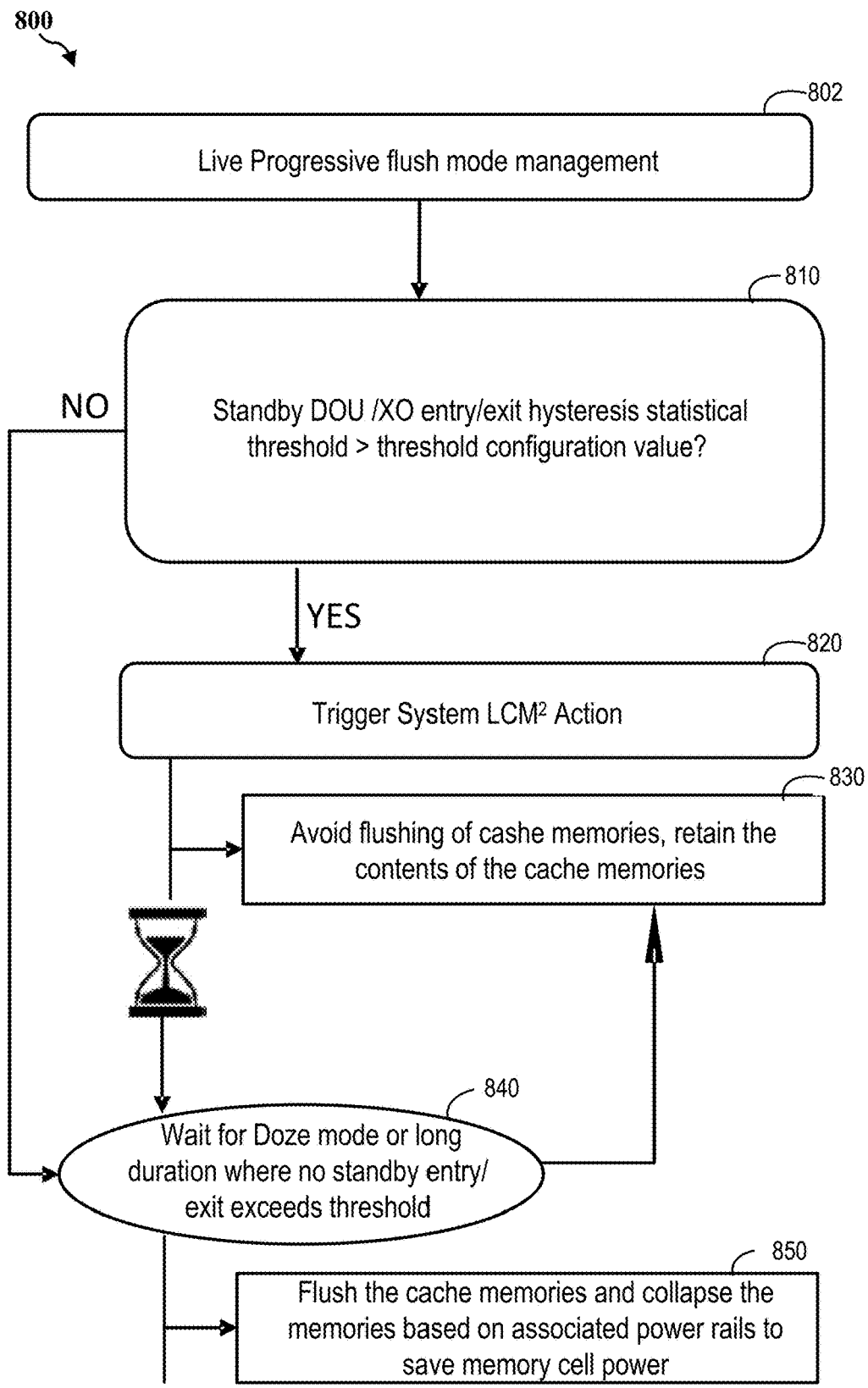
FIG. 8 is a flowchart illustrating a live progressive flush mode management process of the live cache memory management framework method of FIGS. 4A and 4B, according to aspects of the present disclosure.

As shown in FIG. 4B, the live cache and memory management (LCM$^2$) framework provides four schemes for overcoming penalties associated with a cache flush and rebuild policy following exit from the deep sleep state. For example, at block 502, a smart cache management process is performed, for example, as shown in FIG. 5. At block 602, an adaptive system scaling process is performed to reduce latency, for example, as shown in FIG. 6. At block 702, a live memory state management process is performed, for example, as shown in FIG. 7. At block 802, a live progressive flush mode management process is performed, for example, as shown in FIG. 8. In some aspects of the present disclosure, one or a combination of the four schemes is performed for overcoming penalties associated with cache flushing and rebuilding following exit from the deep sleep state. Although four options are described, other options for overcoming the noted penalties associated with cache flushing and rebuilding following exit from the deep sleep state are contemplated according to aspects of the present disclosure.

FIG. 5 is a flowchart illustrating a smart cache management process 500 of the live cache memory management framework method of FIGS. 4A and 4B, according to aspects of the present disclosure. At block 520, a system live cache memory management (LCM$^2$) action is triggered as part of the smart cache management process 500. At block 530, a system cache identification (SCID) cache allocation size is reduced to a specified size (e.g., a reduced size or a minimum size) for a respective network activity triggering a device wakeup. In addition, the system cache is deallocated from any remaining subsystems; however, received messages remain accessible from memory (e.g., double data rate (DDR) memory). For example, as shown in FIG. 3B, the system cache 350 is shared by the SCID clients 360 (360-1, 360-2, . . . , 360-N), in which one of the SCID clients 360 is the CPU. In this example, a size of the system cache 350 allocated to the SCID-client1 360-1 is reduced, and the system cache is deallocated from the remaining ones of the SCID clients 360. As a result, any cache flush and rebuild is limited to the minimum size of the system cache allocated to the SCID-client1 360-1.

At block 540, the remaining printed circuit board (PCB) traces of the remaining subsystems are maintained in a collapsed state during the smart cache management process 500. For example, as shown in FIG. 3B, maintaining PCB traces of the remaining ones of the SCID clients 360 in the collapsed states provides further power savings because the collapsed PCB traces of the remaining ones of the SCID clients 360 do not consume power. At block 550, the cache policy (e.g., including priority, growth, etc.) associated with the smart cache management process 500 is modified. For example, as shown FIG. 3B, cache policy is modified based on priority and growth to expand the minimum size of the system cache allocated to the SCID-client1 360-1 and/or to reallocate to one or more of the remaining SCID clients 360.

FIG. 6 is a flowchart illustrating an adaptive system frequency scaling process 600 of the live cache memory management framework method of FIGS. 4A and 4B, according to aspects of the present disclosure. At block 610, a check is performed to determine whether a network client (e.g., a network application) that requested performance quality of service (QOS) is operating at a sufficient frequency to meet a timeline. At block 620, a system live cache memory management (LCM²) action is triggered as part of the adaptive system frequency scaling process 600. At block 630, dummy votes are added to increase an operating frequency during a standby/suspend path to reduce the flush time. For example, as shown in Table 2, dummy votes may be added to increase the frequency of the MC and the SHUB, enabling entry into an idle state by reducing the flush time and accommodating the requested performance QOS.

FIG. 7 is a flowchart illustrating a live memory state management process 700 of the live cache memory management framework method of FIGS. 4A and 4B, according to aspects of the present disclosure. At block 710, a check is performed to determine whether the standby DOU entry/exit hysteresis statistical threshold remains above the threshold configuration value. If the check fails, control flow branches to block 740. Otherwise, at block 720, a system live cache memory management (LCM²) action is triggered as part of the live memory state management process 700 because the hysteresis statistical threshold remains above the threshold configuration value. At block 730, a low power mode (LPM) of the universal flash storage (UFS) is moved to a Level 3 sleep state and the LPM is disabled. For example, Table 1, illustrates possible power savings by using a Level 3 sleep state to delay entry of the UFS into the Level 5 deep sleep state. At block 740, a wait timer is set for a doze mode (e.g., one hour) to determine whether a standby exit/entry exceeds a threshold and neither the user nor the user's eye is detected and an airplane mode is not detected. If the timer expires, at block 750, the UFS is moved to the Level 5 sleep state. Otherwise, control flow branches back to block 730.

FIG. 8 is a flowchart illustrating a live progressive flush mode management process 800 of the live cache memory management framework method of FIGS. 4A and 4B, according to aspects of the present disclosure. At block 810, a check is performed to determine whether the standby DOU entry/exit hysteresis statistical threshold remains above the threshold configuration value. If the check fails, control flow branches to block 840. Otherwise, at block 820, a system live cache memory management (LCM²) action is triggered as part of the live progressive flush mode management process 800 because the hysteresis statistical threshold remains above the threshold configuration value. At block 830, flushing of the cache memory is avoided and the contents of the cache memories are retained. For example, as shown in FIG. 3B, the period 370 of repeated cache flushing and rebuilding is avoided. At block 840, a wait timer is set for a doze mode (e.g., one hour) to determine whether a standby exit/entry exceeds a threshold. If the timer is completed, at block 850, the cache memories are flushed and a portion of the cache memories is collapsed based on associated power rails to save memory power. Otherwise, control flow branches back to block 830. For example, block 850 includes collapsing power rails of a predetermined portion of the system cache 350 after flushing the system cache 350 when the period of time expires based on the timer.

Some aspects of the present disclosure perform a smart assessment of a histogram based on a hysteresis/history periodicity associated with repeated entry/exit statistics due to incoming messages notifications, extended reality (XR) specific wakeups and system exits from regular sleep cycles. This histogram is compared against a desired threshold as part of a statistical evaluation to determine whether a hysteresis statistical threshold is greater than a desired threshold configuration. Based on this statistical evaluation, some aspects of the present disclosure provide a dynamic change to live memory state management, live cache size/policy management, live progressive cache flush mode management, and/or an adaptive system frequency scaling for reducing latency.

Figure 9:
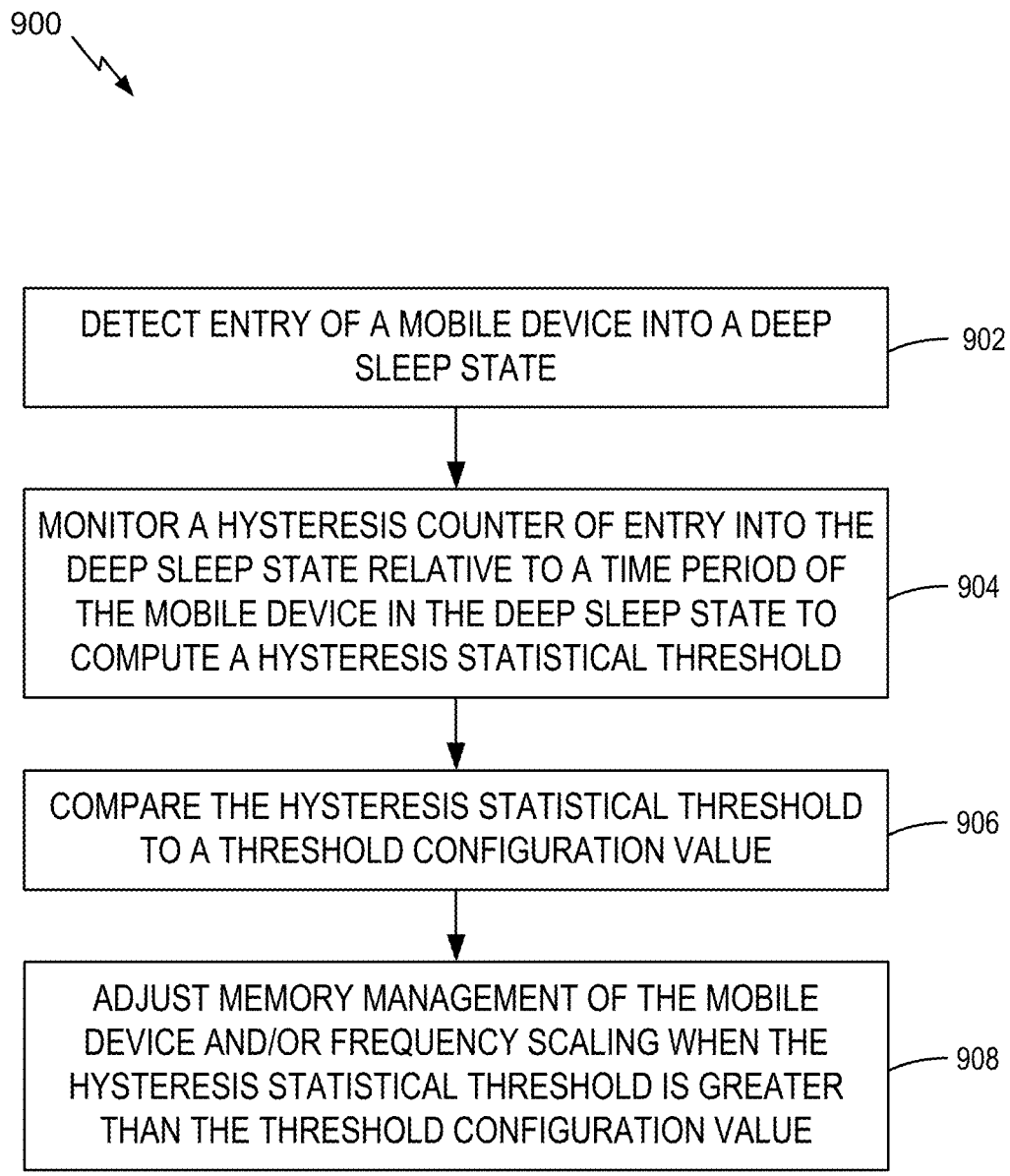
FIG. 9 is a flowchart illustrating a method for memory management, according to aspects of the present disclosure.

FIG. 9 is a flowchart illustrating a method for memory management, according to aspects of the present disclosure. A method 900 begins at block 902, in which entry of a mobile device into a deep sleep state is detected. For example, as shown in FIG. 4A, the flowchart 400 shows a device and system state evaluator module 420, which determines whether the device is expected to enter a standby DOU/deep sleep state to trigger the live cache and memory management framework. The device and system state evaluator module 420 may be registered as a broadcast notifier in response to a state change based on certain parameters or polling. The device and system state evaluator module 420 includes a device state condition notifier 422. At block 430, the device state condition notifier 422 determines whether the device is expected to enter the standby DOU/deep sleep state.

At block 904, a hysteresis counter of entry into the deep sleep state is monitored relative to a time period of the mobile device in the deep sleep state to compute a hysteresis statistical threshold. For example, FIG. 4B illustrates a continuation of the cache memory management framework method of FIG. 4A, in which a smart assessment of hysteresis/history periodicity associated with repeated entry/exit of the standby DOU/deep sleep state occurs. In particular, the smart assessment analyzes the repeated entry/exit due to incoming messages, notifications, XR specific wakeups, and system exits from regular sleep cycles. At block 462, a hysteresis counter of entry into the deep sleep state is compared against a time period that tracks entry into and exit from the deep sleep state to compute a hysteresis statistical threshold.

At block 906, the hysteresis statistical threshold is comparing to a threshold configuration value. For example, as shown FIG. 4B, Once the a hysteresis statistical threshold is computed, hysteresis index bits 464 are used to access a direction array 465 to determine a link into a hysteresis array 466 to determine a threshold configuration value based on the time duration. Next, the hysteresis statistical threshold is compared against the threshold configuration value as part of a statistical evaluation for enabling the live cache and memory management (LCM²) framework at block 468.

At block 908, memory management of the mobile device and/or frequency scaling is adjusted when the hysteresis statistical threshold is greater than the threshold configuration value. For example, as shown in FIG. 4B, the live cache and memory management (LCM²) framework provides four schemes for overcoming penalties associated with a cache flush and rebuild policy following exit from the deep sleep state. For example, at block 502, a smart cache management process is performed, for example, as shown in FIG. 5. At block 602, an adaptive system scaling process is performed to reduce latency, for example, as shown in FIG. 6. At block 702, a live memory state management process is performed, for example, as shown in FIG. 7. At block 802, a live progressive flush mode management process is performed, for example, as shown in FIG. 8.

Implementation examples are described in the following numbered clauses:

1. A method for memory management, the method comprising:
   detecting entry of a mobile device into a deep sleep state;
   monitoring a hysteresis counter of entry into the deep sleep state relative to a time period of the mobile device in the deep sleep state to compute a hysteresis statistical threshold;
   comparing the hysteresis statistical threshold to a threshold configuration value; and
   adjusting memory management of the mobile device and/or frequency scaling when the hysteresis statistical threshold is greater than the threshold configuration value.

2. The method of clause 1, in which monitoring comprises:
   tracking the hysteresis counter of entry into the deep sleep state by the mobile device;
   measuring the time period of the mobile device in the deep sleep state; and
   computing the hysteresis statistical threshold in response to the tracking and the measuring.

3. The method of any of clauses 1 or 2, in which comparing comprises:
   accessing, using a hysteresis index, a direction array to determine a link into a hysteresis array; and
   accessing the threshold configuration value from the hysteresis array based on the link.

4. The method of any of clauses 1-3, in which adjusting comprises:
   identifying a network application triggering a device wakeup; and
   reducing a cache allocation size of a system cache identification (SCID) client corresponding to the network application to a specified size.

5. The method of clause 4, further comprising:
   identifying the SCID clients of a system cache other than the network application;
   maintaining printed circuit board (PCB) traces of the SCID clients in a collapsed state; and
   modifying a policy of the system cache based on the identifying and maintaining.

6. The method of any of clauses 1-3, in which adjusting comprises:
   determining whether a network client that requested performance quality of service (QOS) is operating at a sufficient frequency to meet a timeline; and
   adding dummy votes to increase an operating frequency of a memory microcontroller and a system cache controller to reduce a cache flush time.

7. The method of any of clauses 1-3, in which adjusting comprises:
   reducing a sleep state level of a nonvolatile memory (NVM);
   waiting for a period of time; and
   increasing the sleep state level of the NVM if the period of time is expired before a wakeup of the mobile device from the deep sleep state.

8. The method of any of clauses 1-3, in which adjusting comprises:
   delaying flushing of a system cache;
   waiting for a period of time; and
   flushing the system cache if the period of time is expired before a wakeup of the mobile device from the deep sleep state.

9. The method of clause 8, further comprising collapsing power rails of a predetermined portion of the system cache after flushing the system cache.

10. The method of any of clauses 1-9, in which detecting comprises confirming the deep sleep state when network applications of the mobile device are executing deep sleep paging cycles.

11. A non-transitory computer-readable medium having program code recorded thereon for memory management, the program code being executed by a processor and comprising:
    program code to detect entry of a mobile device into a deep sleep state;
    program code to monitor a hysteresis counter of entry into the deep sleep state relative to a time period of the mobile device in the deep sleep state to compute a hysteresis statistical threshold;
    program code to compare the hysteresis statistical threshold to a threshold configuration value; and
    program code to adjust memory management of the mobile device and/or frequency scaling when the hysteresis statistical threshold is greater than the threshold configuration value.

12. The non-transitory computer-readable medium of clause 11, in which the program code to monitor comprises:
    program code to track the hysteresis counter of entry into the deep sleep state by the mobile device;
    program code to measure the time period of the mobile device in the deep sleep state; and
    program code to compute the hysteresis statistical threshold in response to the tracking and the measuring.

13. The non-transitory computer-readable medium of any of clauses 11 or 12, in which the program code to compare comprises:
    program code to access, using a hysteresis index, a direction array to determine a link into a hysteresis array; and
    program code to access the threshold configuration value from the hysteresis array based on the link.

14. The non-transitory computer-readable medium of any of clauses 11-13, in which the program code to adjust comprises:
    program code to identify a network application triggering a device wakeup; and
    program code to reduce a cache allocation size of a system cache identification (SCID) client corresponding to the network application to a specified size.

15. The non-transitory computer-readable medium of clause 14, further comprising:
    program code to identify the SCID clients of a system cache other than the network application;
    program code to maintain printed circuit board (PCB) traces of the SCID clients in a collapsed state; and
    program code to modify a policy of the system cache based on the program code to identify and the program code to maintain.

16. The non-transitory computer-readable medium of any of clauses 11-13, in which the program code to adjust comprises:
    program code to determine whether a network client that requested performance quality of service (QOS) is operating at a sufficient frequency to meet a timeline; and
    program code to add dummy votes to increase an operating frequency of a memory microcontroller and a system cache controller to reduce a cache flush time.

17. The non-transitory computer-readable medium of any of clauses 11-13, in which the program code to adjust comprises:
   program code to reduce a sleep state level of a nonvolatile memory (NVM);
   program code to wait for a period of time; and
   program code to increase the sleep state level of the NVM if the period of time is expired before a wakeup of the mobile device from the deep sleep state.

18. The non-transitory computer-readable medium of any of clauses 11-13, in which the program code to adjust comprises:
   program code to delay flushing of a system cache;
   program code to wait for a period of time; and
   program code to flush the system cache if the period of time is expired before a wakeup of the mobile device from the deep sleep state.

19. The non-transitory computer-readable medium of clause 18, further comprising program code to collapse power rails of a predetermined portion of the system cache after flushing the system cache.

20. The non-transitory computer-readable medium of any of clauses 11-19, in which the program code to detect comprises program code to confirm the deep sleep state when network applications of the mobile device are executing deep sleep paging cycles.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of Ics (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method for memory management, the method comprising:
   detecting entry of a mobile device into a deep sleep state;
   monitoring a hysteresis counter of entry into the deep sleep state relative to a time period of the mobile device in the deep sleep state to compute a hysteresis statistical threshold;
   comparing the hysteresis statistical threshold to a threshold configuration value;
   detecting a period of repeated exits/entry from/to the deep sleep state when the hysteresis statistical threshold is greater than the threshold configuration value; and
   adjusting memory management of the mobile device and/or frequency scaling during the period of repeated exits from/entry into the deep sleep state.

2. The method of claim 1, in which monitoring comprises:
   tracking the hysteresis counter of entry into the deep sleep state by the mobile device;
   measuring the time period of the mobile device in the deep sleep state; and
   computing the hysteresis statistical threshold in response to the tracking and the measuring.

3. The method of claim 1, in which comparing comprises:
   accessing, using a hysteresis index, a direction array to determine a link into a hysteresis array; and
   accessing the threshold configuration value from the hysteresis array based on the link.

4. The method of claim 1, in which adjusting comprises:
   identifying a network application triggering a device wakeup; and
   reducing a cache allocation size of a system cache identification (SCID) client corresponding to the network application to a specified size.

5. The method of claim 4, further comprising:
   identifying the SCID clients of a system cache other than the network application;
   maintaining printed circuit board (PCB) traces of the SCID clients in a collapsed state; and
   modifying a policy of the system cache based on the identifying and maintaining.

6. The method of claim 1, in which adjusting comprises:
determining whether a network client that requested performance quality of service (QOS) is operating at a sufficient frequency to meet a timeline; and
adding dummy votes to increase an operating frequency of a memory microcontroller and a system cache controller to reduce a cache flush time.

7. The method of claim 1, in which adjusting comprises:
reducing a sleep state level of a nonvolatile memory (NVM);
waiting for a period of time; and
increasing the sleep state level of the NVM if the period of time is expired before a wakeup of the mobile device from the deep sleep state.

8. The method of claim 1, in which adjusting comprises:
delaying flushing of a system cache;
waiting for a period of time; and
flushing the system cache if the period of time is expired before a wakeup of the mobile device from the deep sleep state.

9. The method of claim 8, further comprising collapsing power rails of a predetermined portion of the system cache after flushing the system cache.

10. The method of claim 1, in which detecting comprises confirming the deep sleep state when network applications of the mobile device are executing deep sleep paging cycles.

11. A non-transitory computer-readable medium having program code recorded thereon for memory management, the program code being executed by a processor and comprising:
program code to detect entry of a mobile device into a deep sleep state;
program code to monitor a hysteresis counter of entry into the deep sleep state relative to a time period of the mobile device in the deep sleep state to compute a hysteresis statistical threshold;
program code to compare the hysteresis statistical threshold to a threshold configuration value;
program code to detect a period of repeated exits/entry from/to the deep sleep state when the hysteresis statistical threshold is greater than the threshold configuration value; and
program code to adjust memory management of the mobile device and/or frequency scaling during the period of repeated exits from/entry into the deep sleep state.

12. The non-transitory computer-readable medium of claim 11, in which the program code to monitor comprises:
program code to track the hysteresis counter of entry into the deep sleep state by the mobile device;
program code to measure the time period of the mobile device in the deep sleep state; and
program code to compute the hysteresis statistical threshold in response to the tracking and the measuring.

13. The non-transitory computer-readable medium of claim 11, in which the program code to compare comprises:
program code to access, using a hysteresis index, a direction array to determine a link into a hysteresis array; and
program code to access the threshold configuration value from the hysteresis array based on the link.

14. The non-transitory computer-readable medium of claim 11, in which the program code to adjust comprises:
program code to identify a network application triggering a device wakeup; and
program code to reduce a cache allocation size of a system cache identification (SCID) client corresponding to the network application to a specified size.

15. The non-transitory computer-readable medium of claim 14, further comprising:
program code to identify the SCID clients of a system cache other than the network application;
program code to maintain printed circuit board (PCB) traces of the SCID clients in a collapsed state; and
program code to modify a policy of the system cache based on the program code to identify and the program code to maintain.

16. The non-transitory computer-readable medium of claim 11, in which the program code to adjust comprises:
program code to determine whether a network client that requested performance quality of service (QOS) is operating at a sufficient frequency to meet a timeline; and
program code to add dummy votes to increase an operating frequency of a memory microcontroller and a system cache controller to reduce a cache flush time.

17. The non-transitory computer-readable medium of claim 11, in which the program code to adjust comprises:
program code to reduce a sleep state level of a nonvolatile memory (NVM);
program code to wait for a period of time; and
program code to increase the sleep state level of the NVM if the period of time is expired before a wakeup of the mobile device from the deep sleep state.

18. The non-transitory computer-readable medium of claim 11, in which the program code to adjust comprises:
program code to delay flushing of a system cache;
program code to wait for a period of time; and
program code to flush the system cache if the period of time is expired before a wakeup of the mobile device from the deep sleep state.

19. The non-transitory computer-readable medium of claim 18, further comprising program code to collapse power rails of a predetermined portion of the system cache after flushing the system cache.

20. The non-transitory computer-readable medium of claim 11, in which the program code to detect comprises program code to confirm the deep sleep state when network applications of the mobile device are executing deep sleep paging cycles.

* * * * *